Sept. 19, 1967     H. KLAUE     3,342,290

DISK BRAKE FOR AUTOMOTIVE VEHICLE

Filed Dec. 22, 1964     3 Sheets-Sheet 1

INVENTOR
HERMANN KLAUE

BY *McGlew & Toren*
ATTORNEYS

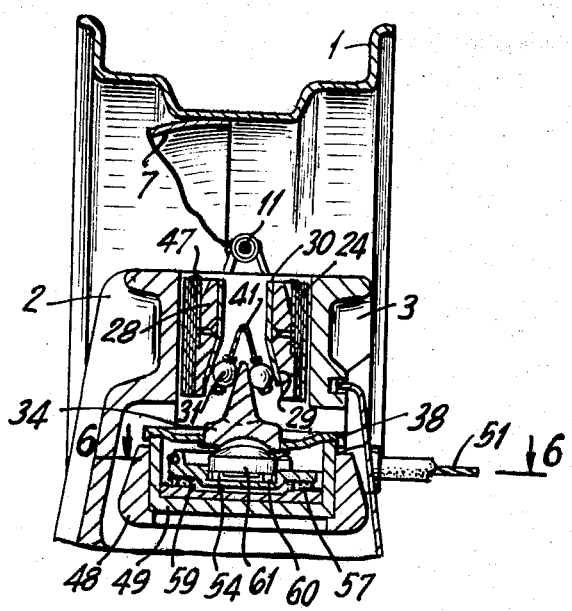
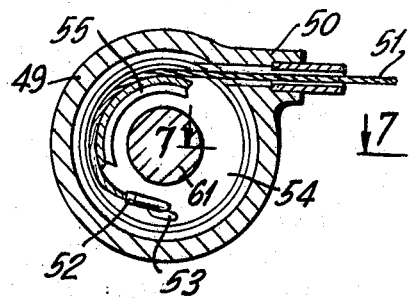
FIG. 5          FIG. 6
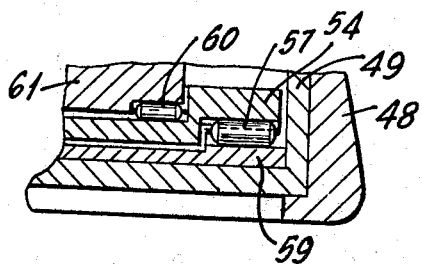
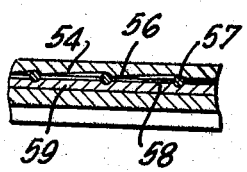
FIG. 7          FIG. 8
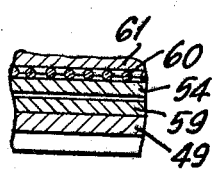
FIG. 9
INVENTOR
HERMANN KLAUE
BY
ATTORNEYS

United States Patent Office 3,342,290
Patented Sept. 19, 1967

3,342,290
DISK BRAKE FOR AUTOMOTIVE VEHICLE
Hermann Klaue, Brugierstrasse 5, Constance
(Bodensee), Germany
Filed Dec. 22, 1964, Ser. No. 420,357
12 Claims. (Cl. 188—72)

This invention relates to disk brakes, particularly for motor vehicles, and, more particularly, to a novel disk brake having heat dissipation properties equivalent to those of a solid disk brake and a greatly reduced cost equivalent to that of a conventional partly-lined disk brake with a revolving center ring.

In a known drum-type brake, wedges, interconnected by a balancer and acting perpendicularly to the axis of the brake, are used to apply the brake shoes against the brake drum. However, aside from the fact that a drum-type brake has properties which are unfavorable as compared to those of a disk brake, no rolling means are provided between the operating wedges and the brake parts to be moved. Consequently, jamming of the operating parts by the lining dust, which is always present in a brake assembly, is unavoidable.

There is also known a disk brake having a revolving lining support and including operating rings, mounted inside the lining supports against rotation, these operating rings exerting the braking force through wedges associated with rolling means, such as balls. The wedges are distributed around the circumference and are articulated on an inner ring, and are forced between the operating rings by the inner ring, which is moved axially by a separate operating member. The disadvantage of this arrangement is the number of transmission elements required, which increases the weight and space requirements for assembly.

There is also known a solid disk brake wherein a ring is positioned between axially spaced brake disks and provided with wedge surfaces extending around its circumference. In this case, the braking force is applied to the brake disks through the medium of rolling means.

An object of the present invention is to provide an improved and simplified disk brake for motor vehicles having good heat dissipation properties.

Another object of the invention is to provide an operating mechanism for disk brakes consisting only of wedge means acting through roller means on the brake shoe means.

A further object of the invention is to provide a disk brake operating mechanism consisting only of wedges, acting through roller means on the brake shoe means, and with these wedges bearing directly against a crowned extension of a brake operating member, such as a brake operating piston.

Yet another object of the invention is to provide a disk brake, particularly for smaller vehicles, combining the thermal advantages of a solid disk brake with the advantage of simplicity inherent in a partly lined disk brake of conventional design.

Still another object of the invention is to provide a disk brake for motor vehicles in which the heat absorbing brake members are separated from the brake operating parts.

A still further object of the invention is to provide a disk brake for smaller vehicles and which is characterized by a relatively small diameter, whereby it may be used with relatively small diameter vehicle wheels.

In accordance with the present invention, these objects are obtained by providing a disk brake in which application of the brake shoes means is effected by one or more rectilinearly radially movable wedges acting perpendicular to the axis of rotation of the brake housing having a disk braking surface. In addition, the operating wedge represents a direct connection between the brake operating member or elements and the brake shoes, bearing in a rolling manner on both sides against axially spaced brake shoes. Further, the direct engagement between the radially inner end of the operating wedge and the rectilinearly radially movable brake operating member is effective through interengaged substantially spherical surfaces, with the brake operating member acting radially and rectilinearly perpendicularly to the axis of the brake housing. Thus, it is possible to provide a disk brake having a very small diameter and in which the heat absorbing and dissipating members are separated from the brake operating parts.

In a preferred form of the invention, axially spaced brake shoes are connected with a fixed support through flexible steel plates or clips, and the revolving brake housing is provided, at either one or a pair of diametrically opposite points of its circumference, with apertures or recesses through which the brake linings, which have a dove-tail connection with the brake shoes and are secured thereto by spring clips, can be readily replaced.

The disk brake of the invention can be operated either solely by hydraulic means, by a combination of hydraulic and mechanical means including a mechanical operating cylinder opposed to a hydraulic operating cylinder, or solely by mechanical means. In accordance with the invention, the mechanical operating means includes a stationary ring having wedges or ramps which extend circumferentially of the ring, and this ring is positioned in a cylinder similar to the hydraulic cylinder. A second ring, which is also provided with ramps extending circumferentially thereof and which may be angularly displaced by means of a rope, cable or operating rod, is juxtaposed with the first ring. The transmission of the braking force to the operating wedge is preferably effected by roller means.

Instead of only two diametrically opposite brake shoe sets, there can be used three or four brake sets, depending on the size of the brake. Also three or four carrier bolts may be used instead of two.

For an understanding of the principles of the invention, reference is made to the following description of a typical embodiment thereof as illustrated in the accompanying drawings.

In the drawings:

FIG. 5 is a partial axial sectional view through a disk brake, in accordance with the invention, and an associated wheel and illustrating means for operating the disk brake mechanically;

FIG. 6 is a partial diametric sectional view through the brake shown in FIG. 1, taken along the line 6—6 of FIG. 5;

FIG. 7 is a partial sectional view, taken along the line 7—7 of FIG. 6;

FIG. 8 is a sectional view illustrating the operating rollers; and

FIG. 9 is a sectional view illustrating the support rollers, both FIGS. 8 and 9 being referred to the embodiment of the invention shown in FIGS. 5, 6 and 7.

Figure 1:
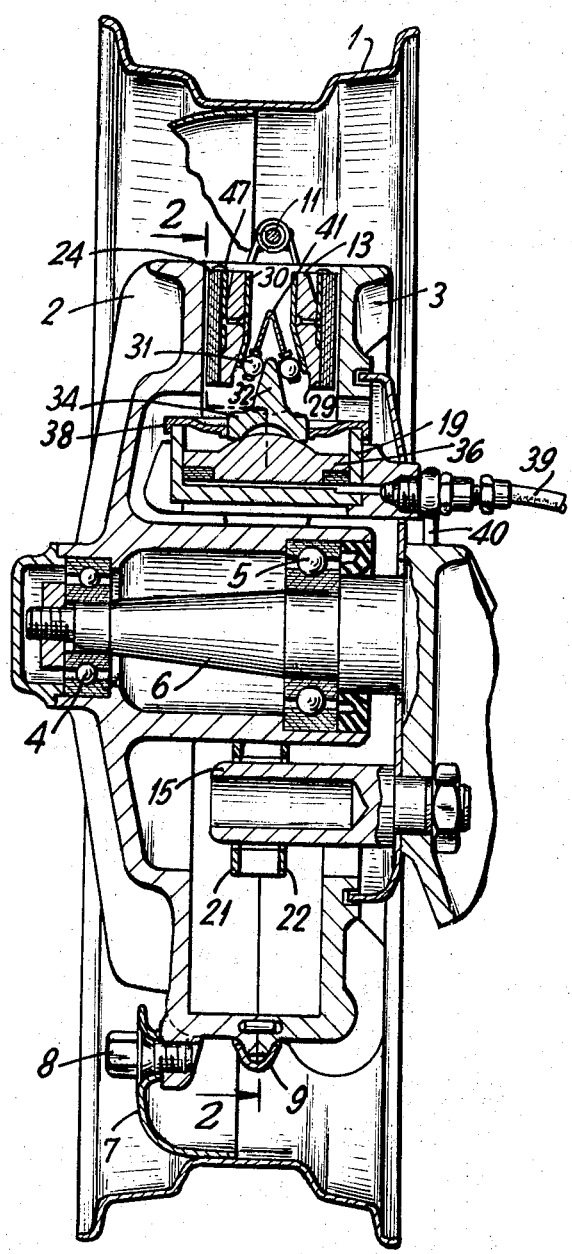
FIG. 1 is an axial sectional view through the front axle of a motor vehicle illustrating the disk brake of the invention in association with a vehicle wheel.

Referring first to that form of the invention shown in FIGS. 1–4, a vehicle wheel rim is illustrated at 1 as revolving with a brake housing means including a body 2 and a cover 3. In the illustrated embodiment, the brake housing 2 is designed as a substantially cylindrical hub supported by means of anti-friction bearings 4 and 5 on the spindle or axle 6 of the vehicle wheel. Wheel disk 7, secured to rim 1, is connected by studs or screws 8 to brake housing 2. Housing 2 and cover 3 have radial ribs serving as reinforcements and also as air circulating means for heat dissipation.

Figure 2:
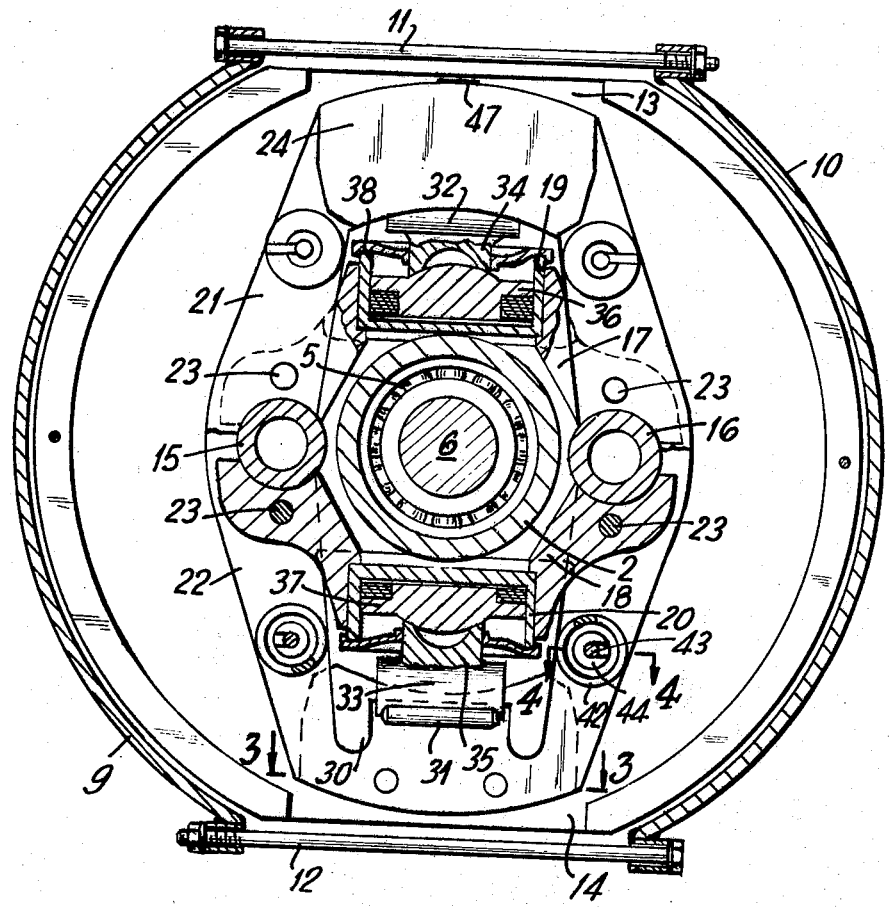
FIG. 2 is a sectional view, with parts broken away, taken on the line 2—2 of FIG. 1.
Figure 3:
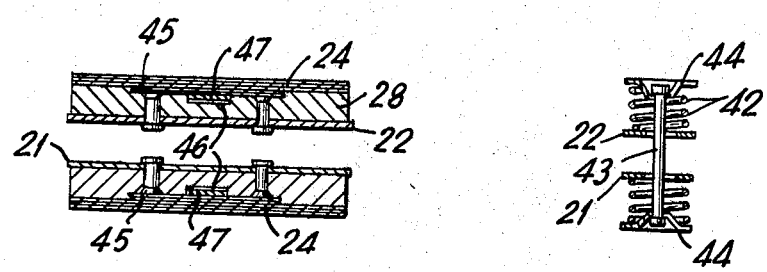
FIG. 3 is a sectional view, taken on the line 3—3 of FIG. 2, and illustrating the brake shoes and the brake linings mounted thereon.

Housing 2 and brake cover 3 have conical projections around their outer circumferences, and these conical projections are embraced by arcuately extending, V-shaped cross section clips 9 and 10 which serve to connect the housing and the cover together and which are drawn into clamping relation by bolts 11 and 12, as best seen in FIG. 2. Clips 9 and 10 have an angular extent such that they allow access to recesses 13 and 14 in brake housing 2 and brake cover 3.

Two cylindrical carriers 15 and 16 are provided for the brake operating parts, and are connected with axle or spindle 6 by suitable means such as screws, bolts or nuts. Through the medium of axle bridging support members 17 and 18, carriers 15 and 16 are connected with brake cylinders 19 and 20 supported by the support members or structure. Two spring clips 21 and 22, of steel plate, are connected with the bridge members 17 and 18 by rivets 23. The outer ends of clips 21 and 22 have riveted thereto the brake shoes 28 which mount the brake linings 24.

Brake shoes or segments 28 are preferably formed of light metal, and have beveled surfaces 29 which are engaged by extensions 30 of spring clips 21 and 22. When the brake is operated, these extensions are under the pressure of rollers 31 which transform the forces, exerted by wedges 32 and 33 in a radial direction, into forces directed axially against the brake shoes. Wedges 32 and 33 have circular or cylindrical extensions or ends 34 and 35, respectively, which have spherical surface portions engaging convex spherical surfaces on pistons 36 and 37 of brake cylinders 19 and 20, respectively. Sleeves 38 protect the brake cylinders against entry of dirt and other foreign matter.

Figure 4:
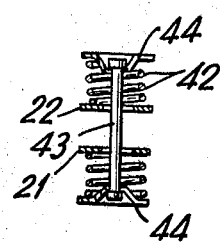
FIG. 4 is a partial sectional view, taken on the line 4—4 of FIG. 2, and illustrating the brake releasing spring means.

Brake fluid is supplied to upper brake cylinder 19 through a line 39, and to lower brake cylinder 20 through a pipe 40 connected with the upper brake cylinder. Cages 41 are operatively associated with the rollers or balls 31 and restrain these balls from dropping out of the assembly. Compression springs 42, as best seen in FIG. 4, augment the resilient effect of spring clips 21 and 22 during return of the brake shoes to the disengaged position after a braking operation. These compression springs are interconnected by a tie rod 43 and plates or seats 44.

Brake linings 24 have dove-tail ribs or transverse extensions 45 which engage in correspondingly shaped recesses or grooves in the respective brake shoes 28. An outwardly diverging recess 46 extends radially of each brake shoe, opening into the dove-tail recess therein, and each recess 46 receives a metal spring 47 having a hooked-shaped end extension preventing disengagement of linings 24 from the associated brake shoes 28. When the brake linings are to be replaced, metal springs 47 can be deflected, by access through recesses 13 and 14, to release the brake linings 24 for removal and replacement.

Where a mechanical operation of the brake is required, such as usually necessary for the rear wheels of motor vehicles, one or both of the hydraulic operating means of each disk brake can be replaced by a mechanical operation means. Such an arrangement is shown in FIGS. 5–9. Referring to these figures, a cylinder 49 secured in an axle bridging support member 48 has a tubular extension 50 through which extends a rope or cable 51 connected with the hand brake lever of the car. Through an eyelet 52, cable 51 is secured to a hook 53 of an operating ring 54 and is trained around an arcuate guide extension 55. As best seen in FIG. 8, ring 54 has ramps 56 extending circumferentially thereof. Through the medium of operating rollers 57, ramps 56 cooperate with ramps 58 extending circumferentially of a second ring 59 fixedly connected with cylinder 49. When cable 51 is tensioned, operating ring 54 is turned. By virtue of rollers 57 engaged between ramps 56 and 58, ring 54 is moved outwardly and axially of cylinder 49. Through rollers 60 engaged with the outer surface of ring 54, this movement is transmitted to an operating member 61, as best seen in FIGS. 5, 7 and 9. Member 61 has a spherical surface portion engageable with the spherical surface portions on the extensions 34 of wedges 32.

While a specific embodiment of the invention has been shown and described in detail to illustrate the application of the principles of the invention, it will be understood that the invention may be embodied otherwise without departing from such principles.

What is claimed is:

1. A disk brake, particularly for motor vehicles, comprising, in combination, a brake housing revolvable with a vehicle wheel and having a radial disk braking surface; brake shoe means fixed against rotation with said housing and engageable, by movement parallel to the axis of said housing, with said disk braking surface; brake operating means fixed against rotation with said housing and including at least one brake operating member movable only rectilinearly radially of said housing relative to the axis of rotation thereof; radially movable wedge means having a radially inner end directly engaged with said operating member for movement thereby, and a radially outer wedge formation at least partially overlapping said brake shoe means; and roller means interposed between the wedge formation of said wedge means and said brake shoe means, and directly engaged with said wedge means and with said brake shoe means, to transmit a braking force from said operating member to said brake shoe means.

2. A disk brake, particularly for motor vehicles, comprising, in combination, a brake housing revolvable with a vehicle wheel and having a pair of axially spaced radial disk braking surfaces; brake shoe means fixed against rotation with said housing and engageable, by movement parallel to the axis of said housing, with said disk braking surfaces; brake operating means fixed against rotation with said housing and including at least one brake operating member movable only rectilinearly radially of said housing relative to the axis of rotation thereof; radially and rectilinearly movable wedge means having a radially inner end directly engaged with said operating member for movement thereby, and a radially outer wedge formation extending between said brake shoe means; and roller means interposed between the radially outer portion of said wedge means and said brake shoe means, and directly engaged with said wedge means and with said brake shoe means to transmit the braking force from said operating member to said brake shoe means.

3. A disk brake, particularly for motor vehicles, comprising, in combination, a brake housing revolvable with a vehicle wheel and having a radial disk braking surface; brake shoe means fixed against rotation with said housing and engageable, by movement parallel the axis of said housing, with said disk braking surface; brake operating means fixed against rotation with said housing and including at least one brake operating member movable only rectilinearly radially of said housing relative to the axis thereof and having its radially outer end formed with a substantially spherical surface portion; at least one radially and rectilinearly movable wedge in operative association with said brake shoe means and having a radially inner end formed with a spherical surface portion directly engaged with the spherical surface portion of said operating member for movement of said wedge by said operating member and a radially outer wedge formation at least partially overlapping said brake shoe means; and roller means interposed between the radially outer portion of said wedge means and said brake shoe means, and directly engaged with said wedge means and with said brake shoe means to transmit the braking force from said operating member to said brake shoe means.

4. A disk brake, particularly for motor vehicles, comprising, in combination, an axle; a brake housing rotatably mounted on said axle and having a radial disk braking surface; a support structure fixedly mounted on said axle; brake shoe means mounted on said support structure and engageable, by movement parallel to said axle, with said disk braking surface; brake operating means mounted on said support structure and including at least one brake operating member movable only rectilinearly radially of said housing relative to said axle; radially movable wedge means operatively associated with said brake shoe means and having a radially inner end directly engaged with said operating member for movement thereby and a radially outer wedge formation at least partially overlapping said brake shoe means; and roller means interposed between the radially outer portion of said wedge means and said brake shoe means, and directly engaged with said wedge means and with said brake shoe means, to transmit the braking force from said operating member to said brake shoe means.

5. A disk brake, particularly for motor vehicles, comprising, in combination, a vehicle axle; a substantially cylindrical brake housing rotatably mounted on said axle and having a pair of axially spaced radial disk braking surfaces in facing relation with each other; a support structure fixedly mounted on said housing; at least one pair of lined brake shoes mounted on said support structure, each shoe being engaged with a respective one of said disk braking surfaces; brake operating means mounted on said axle and including at least one brake operating member movable only rectilinearly and radially of said housing relative to said axle; at least one radially movable wedge having a radially outer wedge portion disposed between said lined brake shoes and having its radially inner end directly engaged with said operating member for movement thereby; and roller means interposed between the radially outer portion of said wedge means and said lined brake shoes, and directly engaged with said wedge means and with said brake shoes, to transmit the braking force from said operating member to said lined brake shoes.

6. A disk brake, as claimed in claim 5, said substantially cylindrical brake housing being formed with an opening therein adjacent said lined brake shoes for access to the latter for maintenance, repair and replacement of said lined brake shoes.

7. A disk brake, particularly for motor vehicles, comprising, in combination, a vehicle axle; a substantially cylindrical brake housing rotatably mounted on said axle and having a pair of axially spaced facing radial disk braking surfaces; a support structure fixedly mounted on said axle in bridging relation therewith; at least one pair of lined brake shoes, each shoe being engageable with a respective disk braking surface; flexible metal strip means supporting said lined brake shoes on said support structure for movement of said lined brake shoes parallel to said axle to engage said disk braking surfaces; brake operating means mounted on said axle and including at least one brake operating member movable only rectilinearly radially of said housing relative to said axle; at least one radially and rectilinearly movable wedge having a radially outer wedge portion extending between said lined brake shoes and having a radially inner end directly engaged with the outer end of said operating member for movement by said operating member; and roller means interposed between the radially outer portion of said wedge and said lined brake shoes, and directly engaged with the wedge portion of said wedge and with said lined brake shoes, to transmit the braking force from said operating member to said lined brake shoes.

8. A disk brake, particularly for motor vehicles, comprising, in combination, a vehicle axle; a substantially cylindrical brake housing rotatably mounted on said axle and having a pair of axially spaced facing radial disk braking surfaces; a pair of support members fixedly mounted on said axle and extending radially of said axle and in bridging relation therewith and in diametric alignment; a pair of flexible metal strips extending diametrically of said axle in axially spaced relation and each secured intermediate its ends, to said support members; two pairs of lined brake shoes, each shoe being secured to the radially outer end of a respective metal strip and being arranged to engage a respective one of said radial disk braking surfaces; brake operating means mounted on said support members and including two brake operating members movable only rectilinearly radially of said housing relative to said axle and in diametrically opposed directions; a pair of radially and rectilinearly movable wedges, each having a radially inner end directly engaged with the radially outer end of a respective operating member for movement thereby relative to said lined brake shoes, each wedge having a radially outer wedge portion extending between the lined brake shoes of a respective pair thereof; and roller means interposed between the radially outer portion of each wedge and the associated lined brake shoes, and directly engaged with the wedge portion of said wedge and with the associated lined brake shoes, to transmit the braking force from the associated operating member to the associated lined brake shoes.

9. A disk brake, as claimed in claim 8, each brake operating means including a cylinder on a support member, and each brake operating member being movable axially with respect to the associated cylinder.

10. A disk brake, as claimed in claim 8, each brake operating means including a cylinder on a support member, and each brake operating member being movable axially with respect to the associated cylinder; each brake operating member constituting a piston displaceable axially of the associated cylinder by fluid pressure.

11. A disk brake, as claimed in claim 8, the cylindrical periphery of said brake housing being formed with apertures adjacent each pair of lined brake shoes for access to the latter for inspection, maintenance and repair of the linings.

12. A disk brake, as claimed in claim 8, including spring means biasing said metal strips toward each other to maintain the lined brake shoes out of engagement with the associated disk braking surfaces.

References Cited

UNITED STATES PATENTS

| | | | |
|---|---|---|---|
| 2,058,060 | 10/1936 | Charles | 188—72 |
| 2,262,708 | 11/1941 | Lambert | 188—72 |
| 2,679,303 | 5/1954 | Wright et al. | 188—72 X |
| 2,808,129 | 10/1957 | Kraus | 188—72 |
| 2,850,118 | 9/1958 | Byers | 188—71 |
| 2,893,519 | 7/1959 | Martin | 188—71 |
| 3,167,156 | 1/1965 | Davis et al. | 188—72 |

FOREIGN PATENTS

| | | |
|---|---|---|
| 897,894 | 6/1944 | France. |
| 1,171,286 | 5/1964 | Germany. |
| 1,181,569 | 11/1964 | Germany. |

MILTON BUCHLER, *Primary Examiner.*

F. S. MIDDLETON, *Examiner.*

G. E. HALVOSA, *Assistant Examiner.*